United States Patent
Jaradi et al.

(10) Patent No.: US 11,654,802 B2
(45) Date of Patent: May 23, 2023

(54) SEAT ENERGY ABSORBER

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US); Anil Kalra, Canton, MI (US); Rahul Arora, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 16/884,448

(22) Filed: May 27, 2020

(65) Prior Publication Data

US 2021/0370811 A1    Dec. 2, 2021

(51) Int. Cl.
*B60N 2/427* (2006.01)
*B60R 13/02* (2006.01)
*B60K 37/02* (2006.01)

(52) U.S. Cl.
CPC .......... *B60N 2/42709* (2013.01); *B60K 37/02* (2013.01); *B60R 13/02* (2013.01)

(58) Field of Classification Search
CPC ...... B60N 2/42709; B60K 37/02; B60R 13/02
USPC ....................... 297/216.11, 216.12
See application file for complete search history.

(56) References Cited

U.S. PATENT DOCUMENTS

| | | | |
|---|---|---|---|
| 5,580,124 A * | 12/1996 | Dellanno | B60N 2/803 297/216.12 X |
| 5,782,529 A | 7/1998 | Miller, III et al. | |
| 9,211,827 B2 | 12/2015 | Michalak | |
| 2002/0175544 A1* | 11/2002 | Goor | B60N 2/2863 297/216.11 |
| 2005/0287371 A1* | 12/2005 | Chaudhari | 428/480 |

FOREIGN PATENT DOCUMENTS

| | | |
|---|---|---|
| CN | 207225144 U | 4/2018 |
| DE | 102007048786 A1 | 10/2008 |
| JP | 4861214 B2 | 1/2012 |
| JP | 2015198683 A | 11/2015 |

* cited by examiner

*Primary Examiner* — Anthony D Barfield
(74) *Attorney, Agent, or Firm* — Frank A. MacKenzie; Bejin Bieneman PLC

(57) ABSTRACT

An assembly includes a seatback defining an occupant-seating area. The seatback has a frame and a rear trim cover. The frame is between the occupant-seating area and the rear trim cover. The assembly includes a seat bottom extending from the seatback below the occupant-seating area. The assembly includes a deformable cell between the frame and the rear trim cover. The deformable cell extends from a first end proximate the frame to a second end proximate the rear trim cover. The deformable cell has a contraction between the first end and the second end.

20 Claims, 6 Drawing Sheets

SEAT ENERGY ABSORBER

BACKGROUND

During an impact to a vehicle, one or more components of the vehicle may move relative to each other. For example, during a front impact the seats in a passenger cabin may move forward toward to a front bulkhead. As another example, during a rear impact the seats may move rearward toward a rear bulkhead. Seatbacks of the seats may come into contact with one of the bulkheads, e.g., depending a position and orientation of the seats relative to the bulkheads, a severity of the impact, etc.

DETAILED DESCRIPTION

Figure 1:
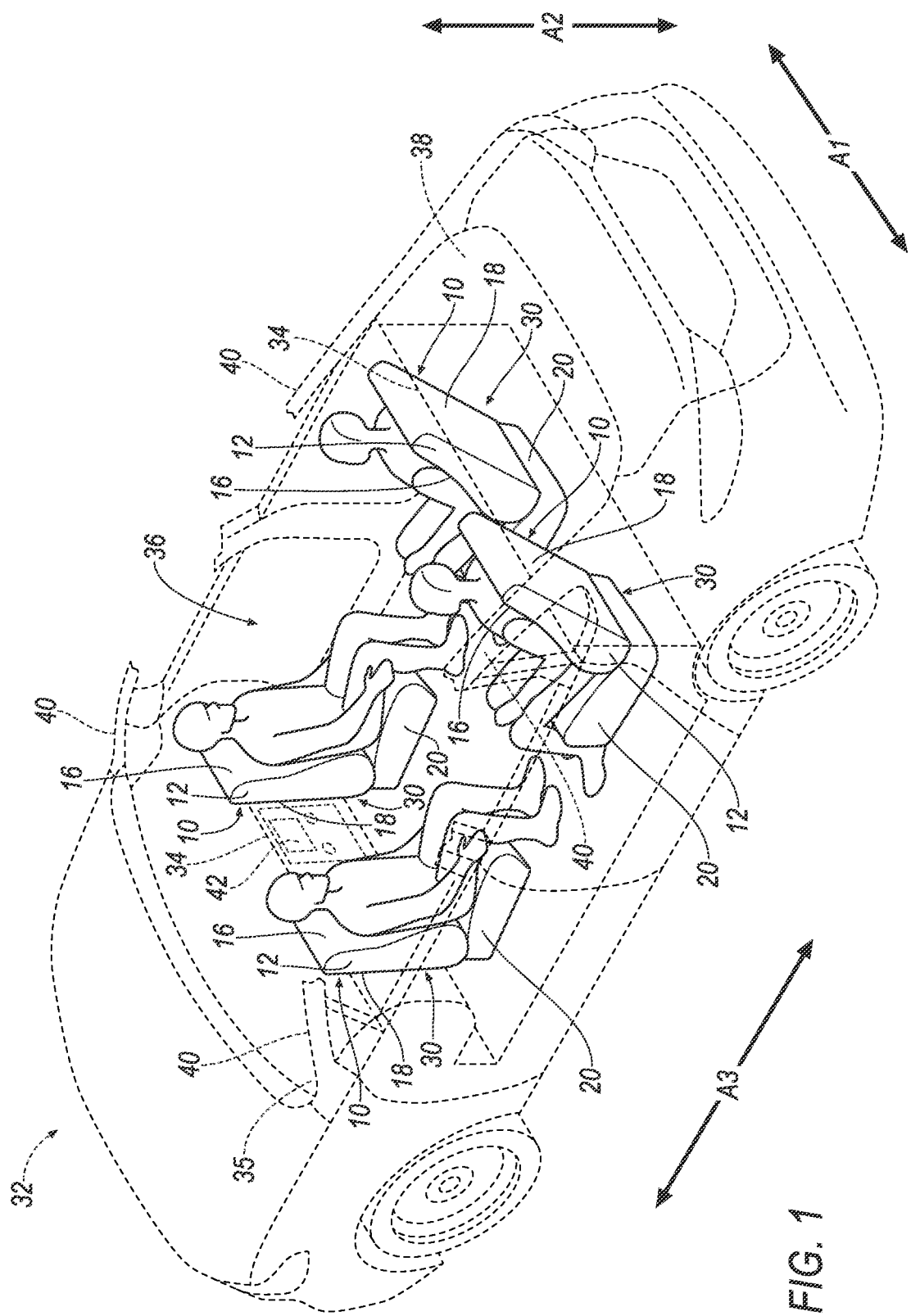
FIG. 1 is a perspective view of a vehicle having seats and bulkheads.

An assembly includes a seatback defining an occupant-seating area. The seatback has a frame and a rear trim cover. The frame is between the occupant-seating area and the rear trim cover. The assembly includes a seat bottom extending from the seatback below the occupant-seating area. The assembly includes a deformable cell between the frame and the rear trim cover. The deformable cell extends from a first end proximate the frame to a second end proximate the rear trim cover. The deformable cell has a contraction between the first end and the second end.

The first end may be fixed to the frame.

The second end may be fixed to the rear trim cover.

The frame may include a panel at the first end of the deformable cell.

The rear trim cover may include a panel at the second end of the deformable cell.

The deformable cell may be fixed to one of the frame and the rear trim cover and abut the other of the frame and the rear trim cover.

The deformable cell may be elongated along an axis from the first end to the second end and the contraction extends endlessly about the axis.

The deformable cell may define an interior chamber.

The deformable cell may enclose the interior chamber.

The deformable cell may include a vent in communication with the interior chamber, the vent being releasable in response to pressure in the interior chamber exceeding a threshold.

The deformable cell may include an outer shell that defines the interior chamber and a fill in the interior chamber.

The outer shell may be a different material than the fill.

The deformable cell may be hourglass shaped.

The deformable cell may be circular in cross section at the first end, the second end, and the contraction.

The contraction may be narrower than the first end and the second end.

The assembly may include a plurality of the deformable cells between the frame and the rear trim cover, the deformable cells spaced from each other.

The deformable cells may be at a top third of the seatback.

The assembly may include a vehicle bulkhead, the seat bottom extending from the seatback in a direction away from the vehicle bulkhead, and the deformable cell may be between the frame of the seatback and the vehicle bulkhead.

The assembly may include a passenger cabin, and the vehicle bulkhead may be at a front of the passenger cabin.

The vehicle bulkhead may include an instrument panel.

With reference to the Figures, wherein like numerals indicate like parts throughout the several views, an assembly 10 includes a seatback 12 defining an occupant-seating area OSA. The seatback 12 has a frame 14 and a rear trim cover 18. The frame 14 is between the occupant-seating area OSA and the rear trim cover 18. The assembly 10 includes a seat bottom 20 extending from the seatback 12 below the occupant-seating area OSA. The assembly 10 includes a deformable cell 22 between the frame 14 and the rear trim cover 18. The deformable cell 22 extends from a first end 24 proximate the frame 14 to a second end 26 proximate the rear trim cover 18. The deformable cell 22 has a contraction 28 between the first end 24 and the second end 26.

The assembly 10 controls kinematic motion of a seat 30 having the seatback 12 and the seat bottom 20 relative to a component of a vehicle 32. For example, opposing forces applied during an impact to the deformable cell 22 by the frame 14 and a bulkhead 34 of the vehicle 32 may deform the deformable cell 22. In particular, the deformable cell 22 may absorb and dissipate kinetic energy during an impact that moves the seatback 12 into contact with the bulkhead 34, e.g., when the seat 30 is rear facing and the bulkhead 34 is at a front end 35 of a passenger cabin 36 of the vehicle 32. The contraction 28, illustrated in FIG. 4, is weaker relative to other portions of the deformable cell 22 to encourage deformation of the deformable cell 22 in a controlled manner.

Figure 2:
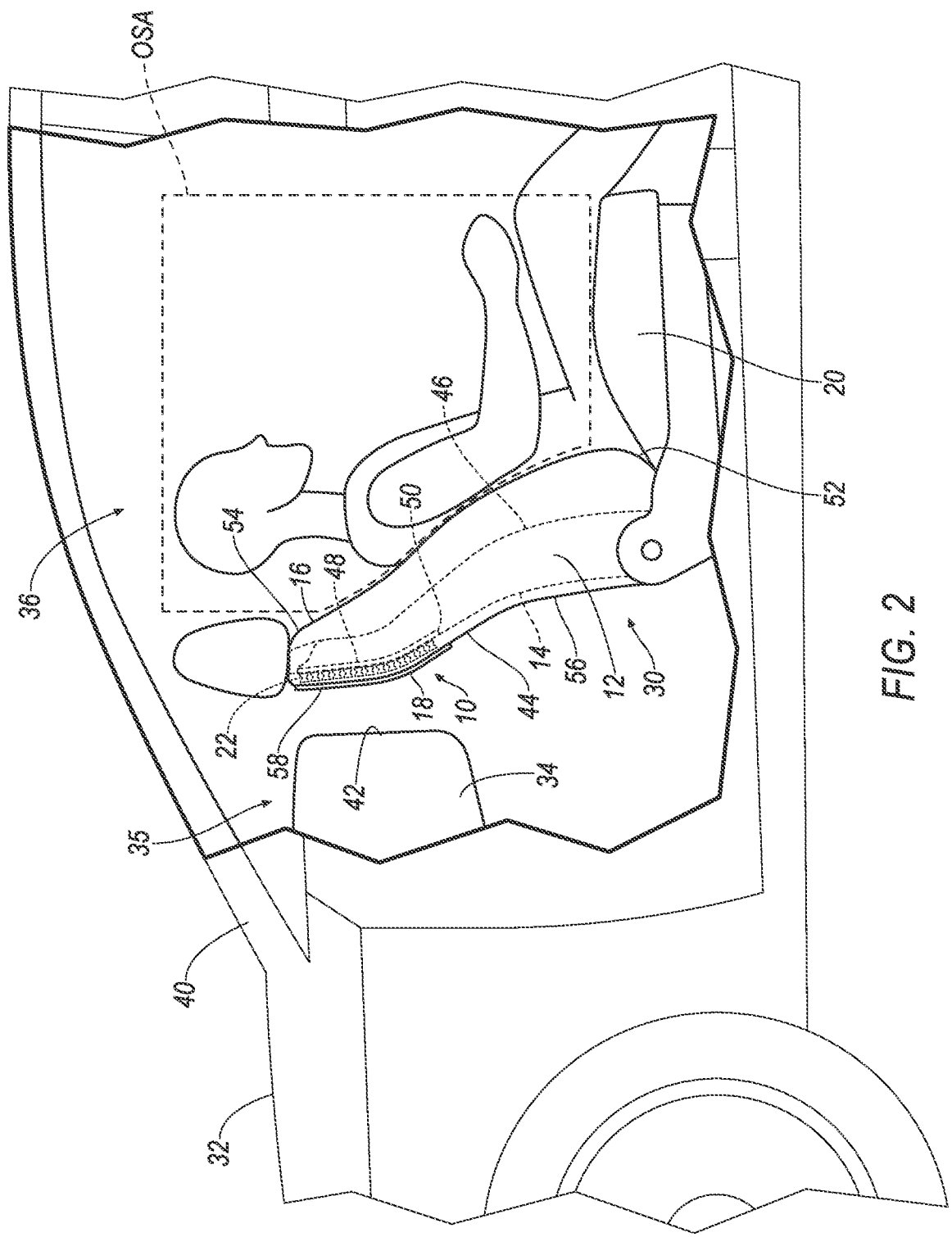
FIG. 2 is a side view of a portion of the vehicle illustrating one of the seats and one of the bulkheads.
Figure 3:
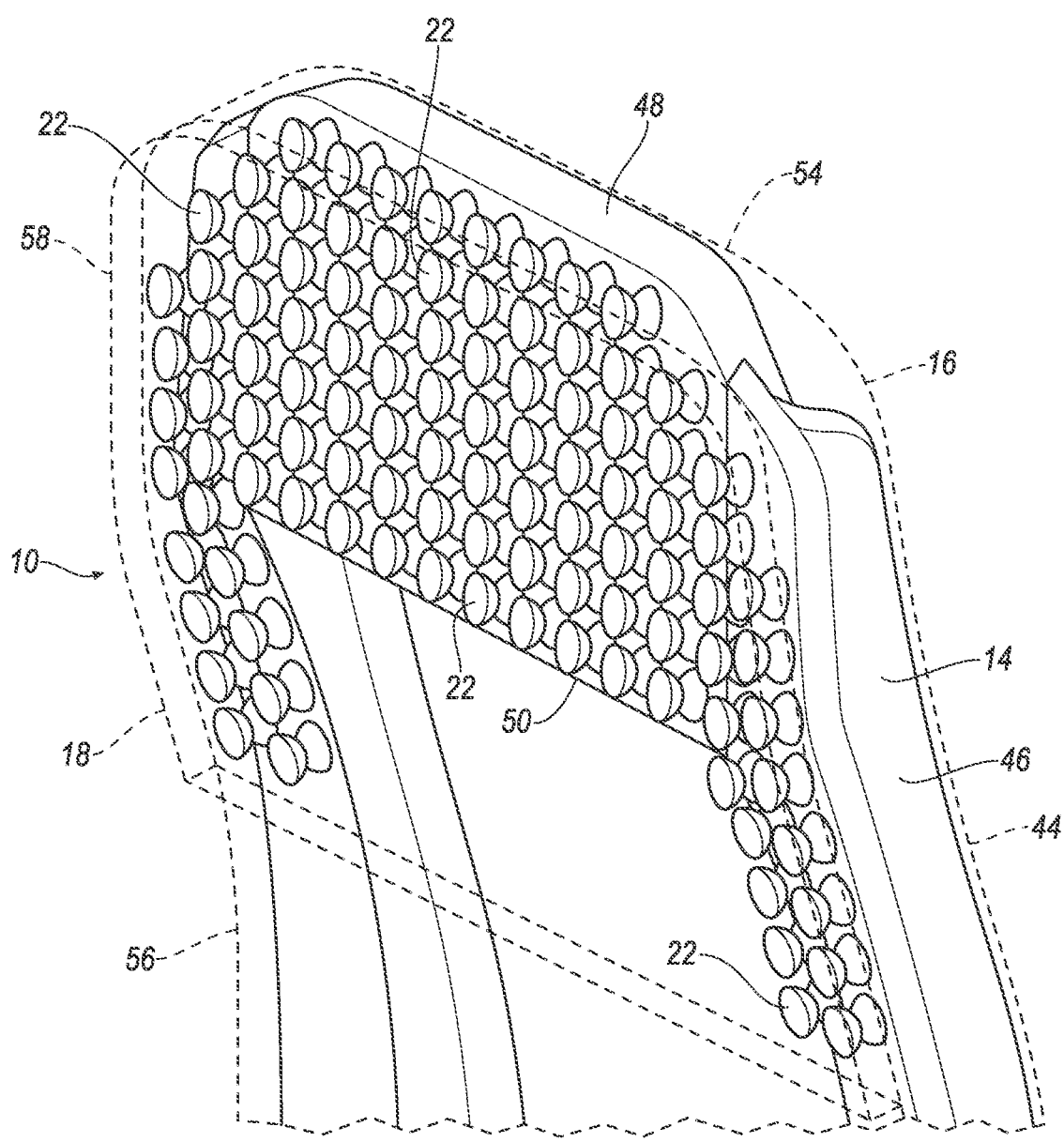
FIG. 3 is a perspective view of a portion of a seat back of the seat and having deformable cells.

With reference to FIGS. 1 and 2, the vehicle 32 may be any suitable type of automobile, e.g., a passenger or commercial automobile such as a sedan, a coupe, a truck, a sport utility vehicle, a crossover vehicle, a van, a minivan, a taxi, a bus, etc. The vehicle 32, for example, may be an autonomous vehicle. In other words, the vehicle 32 may be autonomously operated such that the vehicle 32 may be driven without constant attention from a driver, i.e., the vehicle 32 may be self-driving without human input.

The passenger cabin 36 houses occupants, if any, of the vehicle 32. The passenger cabin 36 may extend across the vehicle 32, i.e., from one side to the other side of the vehicle 32. The passenger cabin 36 includes the front end 35 and a rear end 38 with the front end 35 being in front of the rear end 38 during forward movement of the vehicle 32.

As set forth above, the vehicle 32 includes one or more bulkheads 34. In the example shown in the Figures, the vehicle 32 includes two bulkheads 34 with one bulkhead 34 at the front end 35 of the passenger cabin 36 and one bulkhead 34 at the rear end 38 of the passenger cabin 36. In such an example, the bulkheads 34 may be identical or different. As other examples, the vehicle 32 may include only one bulkhead, i.e., one at the front end 35 or one at the rear end 38. The bulkheads 34 of the vehicle 32 may extend from a pillar 40 on a right side of the vehicle 32 to a pillar 40 on a left side of the vehicle 32. In other words, the bulkheads 34 may extend completely across the passenger cabin 36 along to a cross-vehicle axis A1. The bulkheads 34 may each extend from a floor of the passenger cabin 36 to a respective front or rear windshield, e.g., relative to a vertical axis A2 of the vehicle 32. The bulkheads 34 may include an instrument panel 42. The instrument panel 42 includes one or more instruments such as gauges, displays, a user interface, etc. The instrument panel 42 may be elongated along the cross-vehicle axis A1 from the left side of the vehicle 32 to the right side of the vehicle 32. The instrument panel 42 presents information to and may receive information from an occupant of the vehicle 32. The instrument panel 42 may include dials, digital readouts, screens such as a touch-sensitive display screen, speakers, buttons, knobs, keypads, microphone, and so on for providing information to, and receiving information from, the occupant. The instrument panel 42 may support vehicle controls, including a steering wheel.

One or more seats 30 are supported in the passenger cabin 36, e.g., between the bulkheads 34 along a vehicle longitudinal axis A3. The seats 30 each include the seatback 12 and the seat bottom 20. The seatback 12 may be supported by the seat bottom 20 and may be stationary or movable relative to the seat bottom 20. The seatback 12 and the seat bottom 20 may be adjustable in multiple degrees of freedom. Specifically, the seatback 12 and the seat bottom 20 may themselves be adjustable, in other words, adjustable components within the seatback 12 and/or the seat bottom 20, and/or may be adjustable relative to each other. The seats 30 may each rotate between a forward-facing position (toward the front end 35) and a rear-facing position (toward the rear end 38), and/or positions therebetween.

With reference to FIGS. 2-4B, the seatback 12 may include the frame 14 and a covering 44 supported on the frame 14. The frame 14 may include tubes, beams, etc. Specifically, the frame 14 may include a pair of upright frame members 46. The upright frame members 46 are elongated, and specifically, are elongated in a generally upright direction when the seatback 12 is in a generally upright position. The upright frame members 46 are spaced from each other, and the frame 14 may include cross-members (not shown) and/or a panel 48 extending between the upright frame members 46. The panel 48 may extend along at least a top third of the seatback 12 and be spaced from the seat bottom 20. As an example, a bottom edge 50 of the panel 48 may be spaced from the seat bottom 20 by about two-thirds of a length between a bottom 52 and a top 54 of the seatback 12. The frame 14, including the upright frame members 46 and the panel 48, may be of any suitable plastic material, e.g., carbon fiber reinforced plastic (CFRP), glass fiber-reinforced semi-finished thermoplastic composite (organosheet), etc. As another example, some or all components of the frame 14 may be formed of a suitable metal, e.g., steel, aluminum, etc.

The seatback 12 defines the occupant-seating area OSA, illustrated in FIG. 2. The occupant may be disposed in the occupant-seating area OSA when supported by the seat 30, e.g., when seated on the seat bottom 20 and as shown in the Figures. The occupant-seating area OSA may be on a front side of the seatback 12, i.e., where the front side is relative to the seat 30. The seat bottom 20 extends from the seatback 12 below the occupant-seating area OSA, e.g., away from one or the bulkheads 34. For example, the seat bottom 20 of the seat 30 proximate the bulkhead 34 at the front end 35 of the passenger cabin 36 may extend from the respective seatback 12 away from such bulkhead 34 and toward the bulkhead 34 at the rear end 38 of the passenger cabin 36. As another example, the seat bottom 20 of the seat 30 proximate the bulkhead 34 at the rear end 38 of the passenger cabin 36 may extend from the respective seatback 12 away from such bulkhead 34 and toward the bulkhead 34 at the front end 35 of the passenger cabin 36.

Returning to FIGS. 2 and 3, the covering 44 has a class-A surface, i.e., a finished surface exposed to view by a customer and free of unaesthetic blemishes and defects. The covering 44 includes a front trim cover 16 and the rear trim cover 18. The front trim cover 16 is between the frame 14 and the occupant-seating area OSA of the seatback 12. For example, an occupant seated on the seat bottom 20 in the occupant-seating area OSA may recline against the front trim cover 16. The frame 14 is between the front trim cover 16 and the rear trim cover 18.

The covering 44, e.g., the front trim cover 16 and/or the rear trim cover 18, may include upholstery 56 and padding. The upholstery 56 may be cloth, leather, faux leather, or any other suitable flexible material. The upholstery 56 may be stitched in sheets around the frame 14. The padding may be between the upholstery 56 and the frame 14. The padding may be foam or any other suitable material.

The covering 44, e.g., the rear trim cover 18, may include a panel 58. The panel 58 is rigid, e.g., relative to the upholstery 56. The panel 58 may be plastic or any suitable material. The panel 58 may be generally planar and rectangular. The panel 58 may extend from the right side of the seatback 12 to the left side of the seatback 12 at the top third of the seatback 12, e.g., as described for the panel 48 of the frame 14. The panel 58 may distribute force applied to a single point on the panel 58 across the panel 58, e.g., to multiple deformable cells 22.

Figure 5:
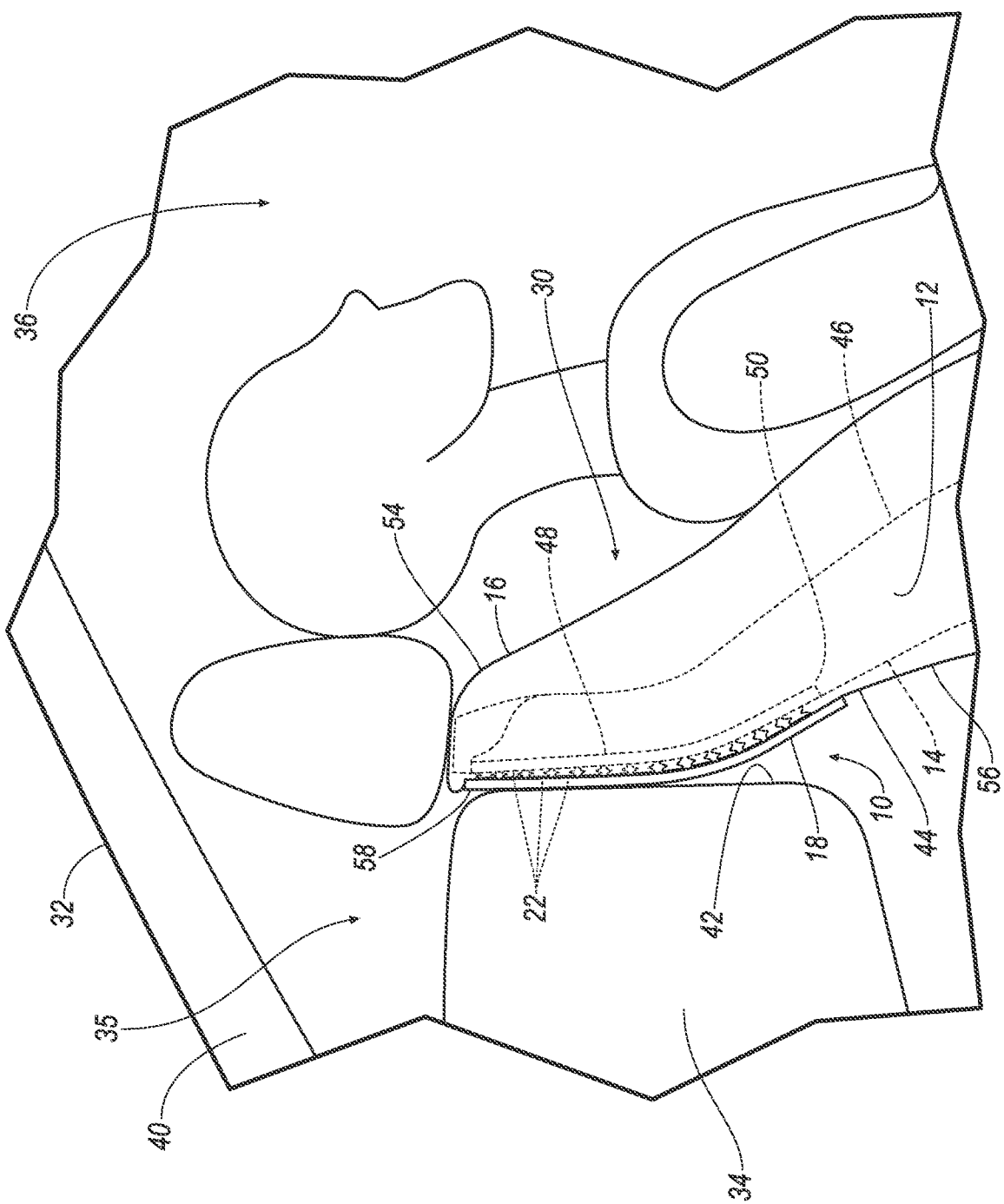
FIG. 5 is a side view of the seatback impacting the bulkhead.

The assembly 10 may include more than one deformable cell 22, i.e., a plurality of deformable cells 22. The deformable cells 22 may be supported by the seatback 12 between the frame 14 and the rear trim cover 18. The deformable cells 22 control kinematics of the seat 30. For example, the deformable cells 22 may decrease a rate of deceleration of the seat 30 that occurs when the rear trim cover 18 impacts the bulkhead 34, sandwiching the deformable cells 22 between the bulkhead 34 and the frame 14, e.g., as illustrated in FIG. 5. The deformable cells 22 may be positioned relative to the seatback 12 to provide reaction force to the frame 14. For example, the plurality of deformable cells 22 may collectively be arranged in an area that covers the panel 48 (e.g., extending vertically and horizontally across the top third of the seatback 12) and the upright frame members 46. Each of the plurality of deformable cells 22 may be spaced from each other, e.g., radially relative to an axis A4 defined by each of the deformable cells 22 prior to deformation of the deformable cells 22. The deformable cells 22 are free from contact with adjacent deformable cells 22 when spaced from each other. In one example, one or more for the deformable cells 22 may abut each other after deformation. In another example, the deformable cells 22 may be spaced from each other after deformation.

Figure 4A:
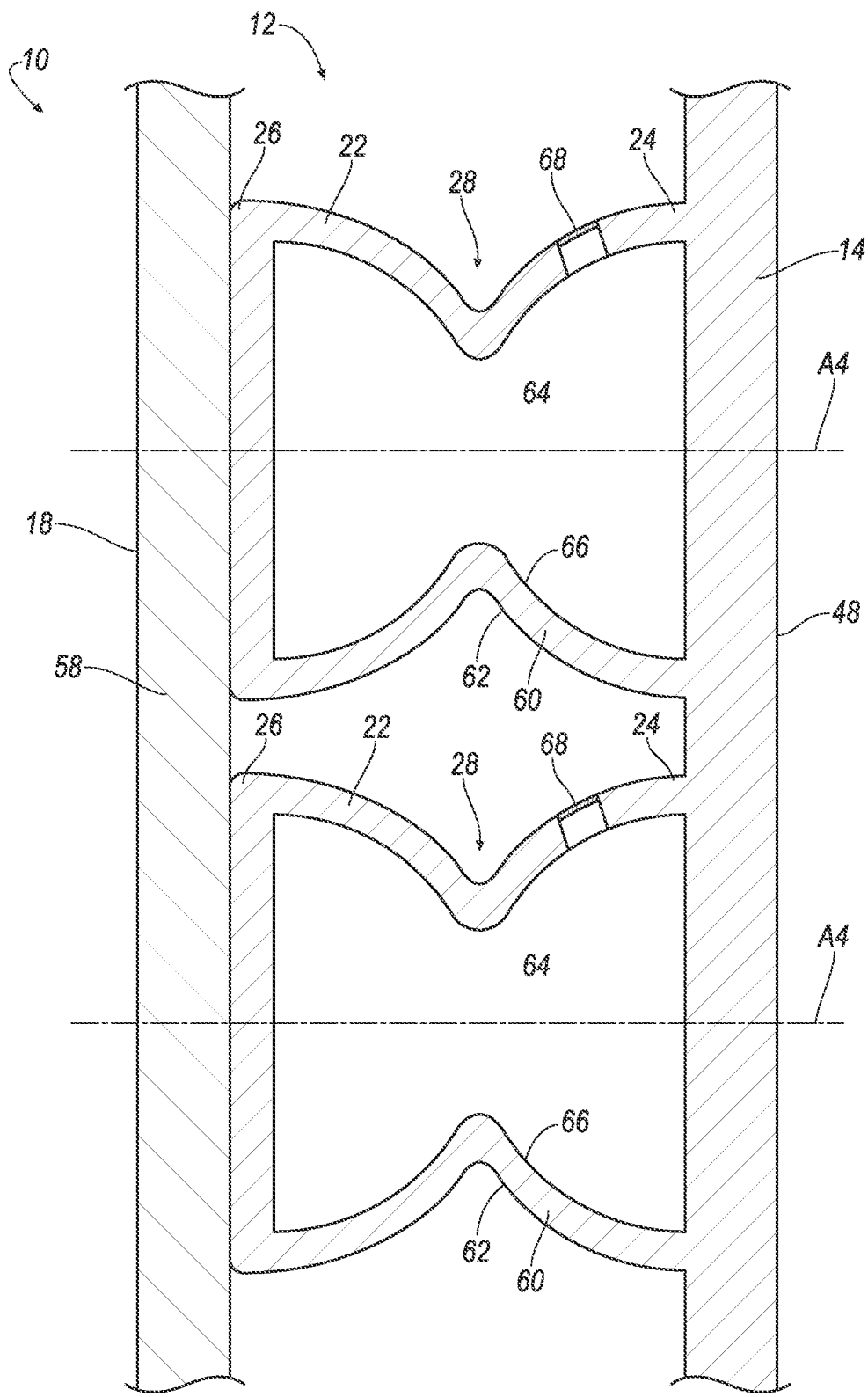
FIG. 4A is a side cross section of a portion of the seat back having deformable cells.
Figure 4B:
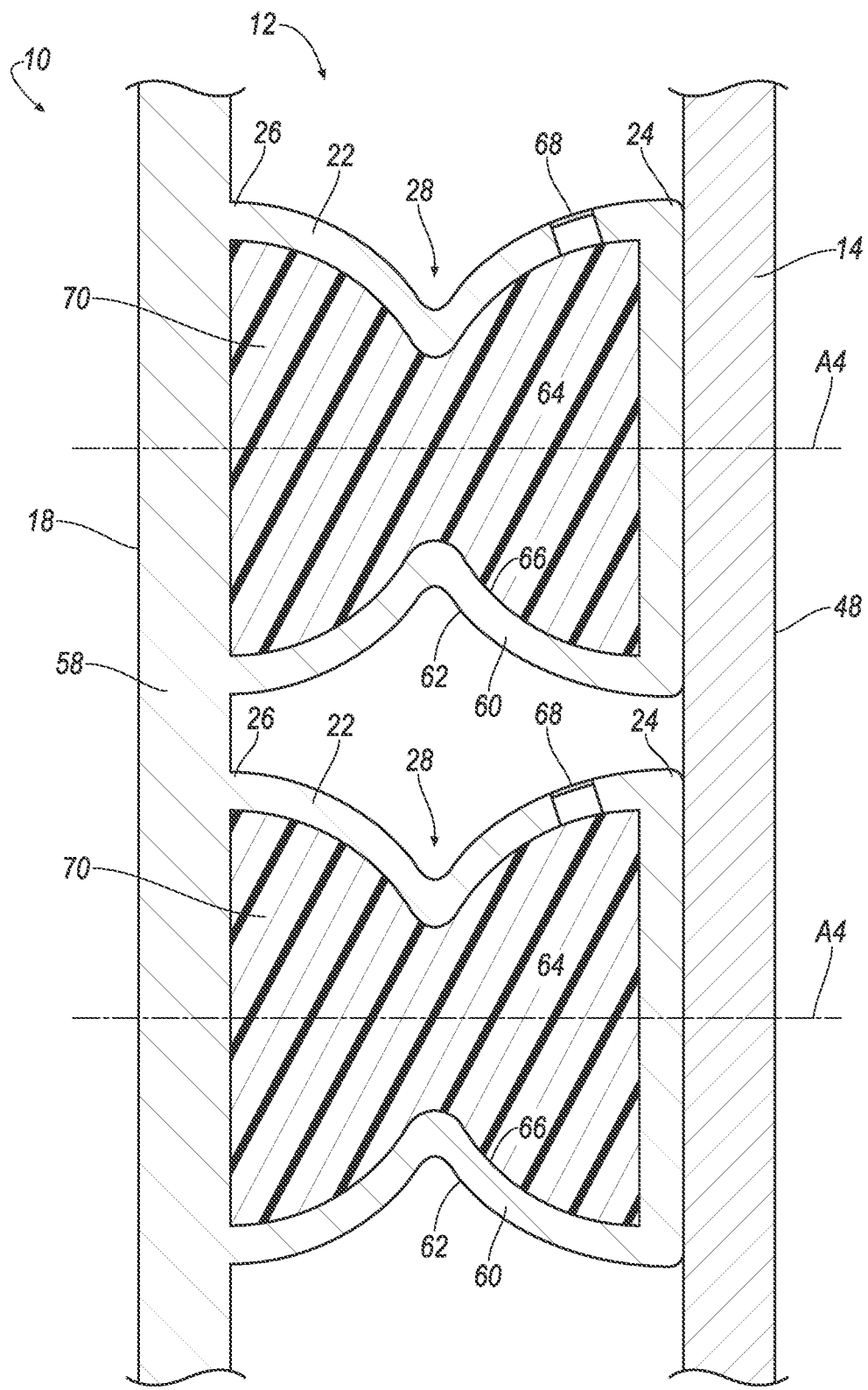
FIG. 4B is another example of a side cross section of a portion of the seat back having deformable cells.

With reference to FIGS. 4A and 4B, the deformable cells 22 each include structure, such as an outer shell 60, that deforms, i.e., bends, crushes, fractures, or otherwise deforms, upon application of a compressive force above a threshold level. The outer shell 60 may be metal, plastic, or any suitable material.

The axes A4 of the deformable cells 22 may be parallel with each other. As another example, the axes A4 may be non-parallel to follow the contours of the frame 14 and/or the trim cover 18. The deformable cell 22 may be elongated along the axis A4.

The deformable cells 22 each extend between respective first ends 24 and second ends 26. The axis A4 defined by the deformable cell 22 extends from the first end 24 to the second end 26. The first end 24 of each deformable cell 22 is proximate the frame 14, i.e., closer to the frame 14 than the second end 26. In other words, the first end 24 is between the second end 26 and the frame 14. The second end 26 of each deformable cell 22 is proximate the rear trim cover 18, i.e., closer to the rear trim cover 18 than the first end 24. In other words, the second end 26 is between the first end 24 and the rear trim cover 18. The deformable cells 22 may be between the panels 48, 58, e.g. with the panel 48 of the frame 14 at the first end 24 of the deformable cell 22 and the panel 58 of the rear trim cover 18 at the second end 26 of the deformable cell 22.

Each deformable cell 22 extends from the frame 14 toward the rear trim cover 18, or vice versa. Each deformable cell 22 may be fixed to the frame 14 or the rear trim cover 18. The deformable cells 22 may be fixed to the frame 14 or the rear trim cover 18 via fastener, adhesive, weld, etc. The deformable cells 22 may be fixed to the frame 14 or the rear trim cover 18 via the deformable cell 22 and the frame 14 or the rear trim cover being unitary, i.e., a single, uniform piece of material with no seams, joints, fasteners, or adhesives holding it together, i.e., formed together simultaneously as a single continuous unit, e.g., by machining from a unitary blank, molding, forging, casting, 3-D printing, etc. Non-unitary components, in contrast, are formed separately and subsequently assembled, e.g., by threaded engagement, welding, etc. Each deformable cell 22 may abut the frame 14 or the rear trim cover 18, i.e., contact without being fixed. For example and as illustrated in FIG. 4A, the first ends 24 of one or more of the deformable cells 22 may be fixed to the frame 14 (e.g., to the panel 48 and/or the upright frame members 46) and the second ends 26 of such deformable cells 22 may abut the rear trim cover 18 (e.g., at the panel 58). As another example and as illustrated in FIG. 4B, the second ends 26 of one or more of the deformable cells 22 may be fixed to the rear trim cover 18 (e.g., to the panel 58) and the first ends 24 of such deformable cells 22 may abut the frame 14 (e.g., at the panel 48 and/or the upright frame members 46).

The contraction 28 of the deformable cell 22 is between the first end 24 and the second end 26 along the axis A4. The contraction 28 between the first end 24 and the second end 26 has a lower strength relative to other portions of the deformable cell 22, e.g., compared to at the ends 24, 26 to control deformation of the deformable cell 22. The contraction 28 is narrower than the first end 24 and the second end 26, i.e., at widths perpendicular to the axis A4. The widths may be measured at an outer surface 62 of the deformable cell 22. The deformable cell 22 may be circular in cross sections at the first end 24, the second end 26, and the contraction 28. For example, the outer surface 62 may be circular in cross section taken perpendicular to the axis A4 at the first end 24, the second end 26, and the contraction 28. The contraction 28 may extend endlessly about the axis A4, i.e., such that the contraction 28 is narrower than the first end 24 and the second end 26 all the way around the axis A4. For example, the deformable cell 22 may be hourglass shaped.

The deformable cell 22 may define an interior chamber 64. For example, the deformable cell 22 may be hollow. The outer shell 60 of the deformable cell 22 may define the interior chamber 64. For example, the deformable cell 22 may include an inner surface 66 opposite the outer surface 62. The inner surface 66 may face the interior chamber 64. The inner surface 66 may surround the interior chamber 64.

The deformable cell 22 may enclose the interior chamber 64, i.e., to restrict fluid from flowing out of the interior chamber 64. The outer shell 60 may continuously extend about the axis A1 to enclose the interior chamber 64. The outer shell 60 at the first end 24 and/or the second end 26 may enclose the interior chamber 64. The panel 58 of the rear trim cover 18 and/or the panel 48 of the frame 14 may enclose the interior chamber 64.

The deformable cell 22 may include a vent 68 in communication with the interior chamber 64, i.e., such that fluid in the interior chamber 64 may flow to the vent 68. The vent 68 is releasable in response to pressure in the interior chamber 64 exceeding a threshold, e.g., 2 pounds per square inch. The threshold may be determined, for example, based on crash testing to control movement of a crash test dummy to meet one or more standards, e.g., NCAP frontal impact testing standard. The vent 68 permits fluid to flow out of the interior chamber 64 when pressure of fluid in the interior chamber 64 is greater than the threshold, and the vent 68 restricts fluid from flowing out of the interior chamber 64 when pressure of fluid in the interior chamber 64 is less than the threshold. Permitting fluid to flow out of the interior chamber 64 decreases an amount of force necessary to deform the deformable cell 22. For example, a strength of the deformable cell 22 may decrease, and the deformable cell 22 may crush, when sufficient compressive force is applied to the first end 24 and the second end 26 to increase pressure of fluid in the interior chamber 64 above the threshold of the vent 68. The vent 68 may include, for example, a passage that extends from the inner surface 66 to the outer surface 62, a pressure valve at the passage designed to open at the threshold, a membrane at the passage designed to rupture at the threshold, etc.

The deformable cell 22 may include a fill 70 in the interior chamber 64, as illustrated in FIG. 4B. The fill 70 includes structure that deforms and/or moves along with deformation of the deformable cell 22. The fill 70 may include, for example, open cell foam, closed cell foam, a series of support ribs, honeycomb structure, etc. Movement and/or deformation of the fill 70 absorbs energy and controls deformation properties of the deformable cell 22, e.g., a crush resistance of the deformable cell 22, etc. The fill 70 may conform to the inner surface 66 of the deformable cell 22. For example, the fill 70 may continuously abut the inner surface 66 from the first end 24 to the second end 26. The fill 70 may be a different material type than the outer shell 60. The material type may be a chemical property, e.g., a compound, of the fill 70 and outer shell 60. For example, the outer shell 60 may be low-density polyethylene and the fill 70 may be expanded polypropylene foam. The material type may be a physical property, e.g., a density, a structural design, etc. For example, the outer shell 60 may be solid and continuous between the inner surface 66 and the outer surface 62 and the fill 70 may include a structural honeycomb. As another example, the outer shell 60 may be high density polyethylene and the fill 70 may be low-density polyethylene. one or more of the deformable cells 22 may be free of having the fill 70, as illustrated in FIG. 4A. The assembly 10 may include only deformable cells 22 including the fill 70. The assembly 10 may include only deformable cells 22 not including the fill 70. The assembly 10 may include one or more of the deformable cells 22 including the fill 70 and one or more of the deformable cells 22 not including the fill 70.

With reference to FIG. 5, when the vehicle 32 is subject to an impact the seatback 12 may move toward the bulkhead 34, e.g., toward the bulkhead 34 at the front end 35 of the passenger cabin 36 during a front impact or toward the bulkhead 34 at the rear end 38 of the passenger cabin 36 during a rear impact. The seatback 12 may impact the bulkhead 34, sandwiching the deformable cells 22 between the frame 14 and the bulkhead 34 and applying compressive forces to the first ends 24 and the second ends 26. The deformable cells 22 may deform, e.g., with the vent 68 and the fill 70 controlling dynamics of such deformation. For example, the fill 70 may deform and move with the deformable cell 22 and the vent 68 may permit fluid flow out if the interior chamber 64 once the compressive forces provide the threshold amount of pressure to the fluid. The deformation of the deformable cells 22 controls kinematics of the seatback 12, e.g., relative to the bulkhead 34.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a seatback defining an occupant-seating area;
   the seatback having a frame and a rear trim cover, the frame being between the occupant-seating area and the rear trim cover;
   a seat bottom extending from the seatback below the occupant-seating area; and
   a plurality of deformable cells between the frame and the rear trim cover, the deformable cells each extending from a first end proximate the frame to a second end proximate the rear trim cover, the deformable cells each having a contraction between the first end and the second end;
   the deformable cells each being elongated along an axis from the first end to the second end and the contraction extends endlessly about the axis.

2. The assembly of claim 1, wherein the first ends are fixed to the frame.

3. The assembly of claim 1, wherein the second ends are fixed to the rear trim cover.

4. The assembly of claim 1, wherein the frame includes a panel at the first ends of the deformable cells.

5. The assembly of claim 1, wherein the rear trim cover includes a panel at the second ends of the deformable cells.

6. The assembly of claim 1, wherein the deformable cells are fixed to one of the frame and the rear trim cover and abut the other of the frame and the rear trim cover.

7. The assembly of claim 1, wherein the deformable cells each define an interior chamber.

8. The assembly of claim 7, wherein each deformable cell encloses its interior chamber.

9. The assembly of claim 8, wherein the deformable cells each includes a vent in communication with the interior chamber, the vent being releasable in response to pressure in the interior chamber exceeding a threshold.

10. The assembly of claim 7, wherein each deformable cell includes an outer shell that defines the interior chamber of the deformable cell and a fill in the interior chamber.

11. The assembly of claim 10, wherein the outer shell is a different material than the fill.

12. The assembly of claim 1, wherein the deformable cell is cells are hourglass shaped.

13. The assembly of claim 1, wherein each deformable cell is circular in cross section at the first end, the second end, and the contraction.

14. The assembly of claim 1, wherein the contraction is narrower than the first end and the second end.

15. The assembly of claim 1, wherein the deformable cells are spaced from each other.

16. The assembly of claim 15, wherein the deformable cells are at a top third of the seatback.

17. The assembly of claim 1, further comprising a vehicle bulkhead, the seat bottom extending from the seatback in a direction away from the vehicle bulkhead, and the deformable cells being between the frame of the seatback and the vehicle bulkhead.

18. The assembly of claim 17, further comprising a passenger cabin, and wherein the vehicle bulkhead is at a front of the passenger cabin.

19. The assembly of claim 17, wherein the vehicle bulkhead includes an instrument panel.

20. The assembly of claim 1, wherein the deformable cells are spaced from each other radially relative to the axis defined by each of the deformable cells prior to deformation of the deformable cells.

* * * * *

UNITED STATES PATENT AND TRADEMARK OFFICE
CERTIFICATE OF CORRECTION

PATENT NO. : 11,654,802 B2
APPLICATION NO. : 16/884448
DATED : May 23, 2023
INVENTOR(S) : Dean M. Jaradi et al.

It is certified that error appears in the above-identified patent and that said Letters Patent is hereby corrected as shown below:

In the Claims

Claim 12, Column 8, Line 21 replace "the deformable cell is cells are" with "--the deformable cells are--"

Signed and Sealed this
Eighteenth Day of July, 2023

Katherine Kelly Vidal
*Director of the United States Patent and Trademark Office*